United States Patent [19]
Leusner

[11] Patent Number: 5,919,503
[45] Date of Patent: Jul. 6, 1999

[54] FLAKED R-T-E CEREAL AND METHOD OF PREPARATION

[75] Inventor: Steven J. Leusner, Orono, Minn.

[73] Assignee: General Mills, Inc., Minneapolis, Minn.

[21] Appl. No.: 08/900,263

[22] Filed: Jul. 25, 1997

[51] Int. Cl.⁶ ..................................................... A23L 1/164
[52] U.S. Cl. ............................. 426/96; 426/560; 426/621
[58] Field of Search ............................... 426/560, 96, 621

[56] References Cited

U.S. PATENT DOCUMENTS

| | | |
|---|---|---|
| 1,989,480 | 1/1935 | Kellogg . |
| 1,990,382 | 2/1935 | Kellogg . |
| 2,196,395 | 4/1940 | Kellogg . |
| 2,333,442 | 11/1943 | Rex . |
| 2,788,277 | 4/1957 | Huber . |
| 3,484,250 | 12/1969 | Vollink et al. . |
| 3,557,718 | 1/1971 | Chivers . |
| 3,578,459 | 5/1971 | Corbin . |
| 3,582,336 | 6/1971 | Rasmusson . |
| 3,595,670 | 7/1971 | Maloney et al. . |
| 3,723,131 | 3/1973 | Bixby et al. . |
| 3,798,338 | 3/1974 | Galle . |
| 3,840,685 | 10/1974 | Lyall et al. . |
| 3,868,471 | 2/1975 | Decelles et al. . |
| 3,876,811 | 4/1975 | Bonner et al. . |
| 3,959,498 | 5/1976 | Lyall et al. . |
| 3,976,793 | 8/1976 | Olson et al. . |
| 3,998,978 | 12/1976 | Lawrence et al. ..................... 426/621 |
| 4,038,427 | 7/1977 | Martin . |
| 4,061,790 | 12/1977 | Cole . |
| 4,211,800 | 7/1980 | Scharschmidt et al. . |
| 4,251,551 | 2/1981 | Van Hulle et al. . |
| 4,409,250 | 10/1983 | Van Hulle et al. . |
| 4,594,252 | 6/1986 | Niemczyk . |
| 4,880,645 | 11/1989 | Carpenter et al. . |
| 4,963,373 | 10/1990 | Fan et al. . |
| 4,988,521 | 1/1991 | Fan . |
| 5,176,936 | 1/1993 | Creighton et al. . |
| 5,182,127 | 1/1993 | Schwab et al. . |
| 5,196,218 | 3/1993 | Schwab et al. . |
| 5,198,255 | 3/1993 | Schwab et al. . |
| 5,200,222 | 4/1993 | Schwab et al. . |
| 5,258,189 | 11/1993 | Efstathiou . |
| 5,338,556 | 8/1994 | Schwab et al. . |
| 5,372,826 | 12/1994 | Holtz et al. . |

OTHER PUBLICATIONS

"Breakfast Cereals and How They Are Made", ed. by Robert B. Fast and Elwood F. Caldwell, American Assoc. of Cereal Chemists, Inc., pp. 15–29, 119–134.

*Primary Examiner*—Helen Pratt
*Attorney, Agent, or Firm*—John A. O'Toole; L. MeRoy Lillehaugen

[57] ABSTRACT

The present invention relates to ready-to-eat cereal flakes exhibiting higher percentages of curled flakes and reduced bulk densities as well as processes for preparing said cereal flakes. More specifically, the present invention provides ready-to-eat cereal flakes fabricated from cooked cereal dough pellets having a bulk density of 150 to 200 g/100³ inch, an average flake thickness of 600 to 800 µm and at least 45% of the flakes being curled to provide a flaked width of at least five millimeters.

27 Claims, No Drawings

FLAKED R-T-E CEREAL AND METHOD OF PREPARATION

FIELD OF THE INVENTION

The present invention relates to food products and to their methods of preparation. More particularly, the present invention relates to ready-to-eat breakfast cereals, particularly in flake form and to their methods of preparation.

BACKGROUND

Ready-To-Eat ("R-T-E") cereals are popular packaged goods food items and exist in a variety of forms including flakes, shreds, biscuits and puffed pieces. The present invention provides an improvement in R-T-E cereal flakes.

Conventionally, R-T-E cereals in the form of flakes are prepared by toasting wet cereal flakes. The toasting causes a tenderizing and slight expansion of the R-T-E cereal flakes. Due to natural variations, a certain percentage of the toasted R-T-E cereal flakes will be more or less flat, e.g., about 60%, while the balance, about 40%, will evidence some degree of curling. The particular percentage distributions between flat and curled flakes will vary modestly with varying composition and method of preparation. However, generally, flat flakes will predominate.

One problem with flat flakes is the consumer perception that such products are somehow less natural than curled flakes. Thus, it would be desirable to increase the percentage of curled flakes and/or their amount of curling so as to improve the consumer's impression of the product.

Another problem with flat flakes resides in the relatively high bulk density such products provide.

The description of the density of an R-T-E cereal can be expressed in many ways. One way is to give an absolute value to the individual R-T-E cereals. An historic approach to determining this absolute density is to measure the displacement of a quantity of the flakes in a suitable medium such as rapeseed (due to the rapeseeds' minute particle size).

Another density description is the bulk density. Bulk density is influenced not only by the absolute density of an R-T-E cereal but also by its piece size and shape leading to wide varieties in packing factors. Of course, the lower the packing factor the more air space that is present between individual R-T-E cereal pieces and the lower the bulk density.

The packing factor for R-T-E cereals influences the bulk density and can also vary widely among various R-T-E cereal types. Thus, puffed cereals, because of their initial low absolute density, typically will have low bulk density values. Puffed cereals of many complex shapes will also tend to have even lower bulk density values due to not only the low absolute density but also because of a low packing factor.

However, for particularly shaped cereals, e.g., flakes, the range in bulk density is more narrow. Variations in the bulk density will vary modestly with such factors as pellet count, i.e., the size of the pellet from which the flake is prepared, which in turn affects piece size and flake thickness.

It would be desirable to be able to vary the bulk density of flaked cereals more widely than is possible using merely pellet count and flake thickness.

One aspect of the desirability to control the bulk density concerns the fill percentage of a typical R-T-E cereal package. Typically, an R-T-E cereal package will have a specific density, e.g., 225 g/100 inches$^3$. The cereal manufacturer will then typically try to fill approximately 80 to 90% of that volume with a given weight of a particular R-T-E cereal. The extra volume is allowed for changes in air pressure, handling, sealing and other factors.

However, due to breakage of the R-T-E cereal product, settling and other factors, when the consumer opens the package it is not uncommon for the consumer to see perhaps as much as the top third of the package being void of the R-T-E cereal as empty head space. Even though the weight of the contained R-T-E cereal is as specified on the package, the consumer perception is that the price-value relationship for the R-T-E cereal product is deficient because of the empty head space.

It is possible to modestly increase the initial bulk density of an R-T-E flaked cereal by decreasing the flake thickness. However, as flake thickness is decreased, the resultant flake becomes increasingly more fragile. Due to the normal stresses of product handling upon manufacturer distribution and sale, some breakage of the flakes is inevitable. As the flakes decrease in thickness and become more fragile, the percentage of breakage increases rapidly, resulting in the generation of high percentages of broken pieces or "fines" that fall to the bottom of the package. As the percentage of fines increases, the bulk density rapidly increases thereby offsetting or even aggravating the empty head space problem in the container.

Likewise, the pellet count can be adjusted to result in changes in the initial bulk density. Thus, the pellet count for a typical flake R-T-E cereal will be in the range of about 35 to 65 pellets per 10 grams. As the pellet count decreases, and the individual flakes become larger, the bulk density will tend to also desirably decrease. However, as further reductions in the pellet count are made, the gains in reduction of bulk density level off and the individual flakes become unappealingly large. Moreover, the fraction of flakes that are curled tends to decrease as pellet count is decreased and individual flake size enlarges.

In view of the limitations in the current state of the art with respect to the ability to desirably decrease the initial bulk density of a flaked R-T-E cereal, there is a continuing need for new and improved flaked R-T-E cereals characterized by decreased bulk densities.

Accordingly, it is an object of the present invention to provide flaked R-T-E cereals of desirably lower bulk densities.

Another object of the present invention is to provide such flaked R-T-E cereals of reduced bulk density which nonetheless are resistant to breakage.

Still another objective of the present invention is to provide flaked R-T-E cereals of reduced bulk density which nonetheless are characterized by relatively high pellet counts.

Another objective of the present invention is to provide flaked R-T-E cereals having higher percentages of curled flakes.

Another object of the present invention is to increase the degree of curling of the curled flake fraction of a flaked R-T-E cereal.

Surprisingly, the above objectives can be realized and improved flaked R-T-E cereal products provided that not only desirably are characterized by lower bulk densities and by increased curling but also are resistant to breakage.

The present invention resides in part in the surprising discovery that by providing flaked R-T-E cereals having a higher percentage of curled flakes that finished R-T-E products of desirably lower bulk densities can be obtained.

In its method aspect, the present invention resides in methods for preparing such flaked, curled R-T-E cereals of reduced bulk density.

The methods importantly involve the step of forming specially shaped pellets having a higher surface area to volume ratio than conventional spherical pellets or pellets having a circular cross sectional area from which wet flakes typically have been obtained.

SUMMARY OF THE INVENTION

In its finished product aspect, the present invention provides improved, more curled flake R-T-E cereal characterized by a lower bulk density. The R-T-E cereal, comprises a quantity of cereal flakes fabricated from a cooked cereal dough having a bulk density of 150 to 200 g/100$^3$ inch, an average flake thickness of 635 to 900 $\mu$m (0.025 to 0.035 inch), a moisture content of about 2 to 5%, and at least 45% of the cereal flakes having a breadth (peak to peak width, with flake laid flat) of at least 5 mm.

In another product aspect, the present invention provides intermediate cereal pellet products characterized by having a high surface area to volume ratio for a given pellet count. The surface area to volume ratio is at least 120% of the surface volume ratio for a given weight pellet than for an equivalent weight pellet having a circular cross section. The pellets weigh about 0.35 to 0.65 g and have a surface area to volume ratio of at least 25 in$^2$/in$^3$ (measured in inches) or 0.95 mm$^2$/mm$^3$ (measured in mm) and a moisture content of about 22 to 35%.

In its method aspect, the present invention provides methods of preparing a flaked R-T-E cereal of enhanced bulk density and percentage of curled flakes. The methods comprise the steps of: A. providing a cooked cereal dough having a moisture content of about 25 to 35%; B. forming the cooked cereal dough in pellets, each weighing about 0.35 to 0.65 g, said pellets having a surface area to volume ratio of at least 25 in$^2$/in$^3$ (measured in inches) or 0.95 mm$^2$/mm$^3$ (measured in mm) and a moisture content of about 22 to 33%; C. drying the pellets to a moisture content of about 16 to 22%; D. flaking the pellets to form wet flakes having a moisture content of about 16 to 22% and a thickness of 380 to 635 $\mu$m (0.015 to 0.025 in); and E. toasting the wet flakes to form a toasted R-T-E cereal having a moisture content of about 2 to 4%, a bulk density of 150 to 200 g/100 in$^3$ (0.107 to 0.120 g/cc), a thickness of about 635 to 900 $\mu$m (0.025 to 0.035 in) and wherein at least 45% of the flakes have a breadth of at least 5 mm.

DETAILED DESCRIPTION OF THE INVENTION

The present invention provides improved flaked cereals of enhanced curl and lower bulk density and further provides methods for preparing such improved flaked cereals.

Throughout the specification and claims, percentages are by weight unless otherwise indicated.

Providing A Cooked Cereal Dough

The present methods essentially comprise the first step of providing a cooked cereal dough.

Cooked cereal doughs for flake R-T-E cereals are well known and the art is replete with methods and compositions suitable for use herein for providing a cooked cereal dough.

Especially useful herein are the methods and compositions described in U.S. Pat. No. 4,988,521 entitled "Ready To Eat Cereal Of Reduced Sodium" issued to S. Fan which is incorporated herein by reference.

Also useful herein are the methods and compositions described in U.S. Pat. No. 5,368,870, entitled "Method For Making Vitamin Enriched Cereal," issued to Efstathiou on Nov. 29, 1994 which is also incorporated herein by reference.

As is described in those references and is more well known, a cooked cereal dough can be prepared by blending various dry cereal ingredients together with water and cooking to gelatinize the starchy components and to develop a cooked flavor. The cooked material can then be mechanically worked to form a cooked cereal dough. The dry ingredients can also include various additives such as sugars, starch and salt. In addition to water, various liquid ingredients such as corn (maize) or malt syrups can be added. A cooked cereal mash is quite similar except that larger size particles such as whole grains or cut grains are cooked together rather than cereal flour ingredients.

The cereal component can comprise any conventionally employed starchy cereal or, synonymously, farinaceous material, for use in an R-T-E cereal. Exemplary suitable starchy cereals include cereal grains, cut grains, grits or flours from wheat, rice, corn, oats, barley, rye, triticale or other cereal grains and mixtures thereof. The flours can be whole flours or flour fractions such as with the germ fraction or husk removed, or, alternatively, brans. Of course, the R-T-E cereal art is well developed and the skilled artisan will have no difficulty selecting suitable farinaceous materials for use herein.

The starchy cereal component can comprise from about 20 to 80% of the cereal composition. Better results in terms of organoleptic attributes and reductions in R-T-E cereal piece frangibility are obtained when the starchy cereal fraction comprises about 30 to 70% of the composition. For best results the starchy cereal fraction comprises about 40 to 50% of the present cereal compositions.

The present cereal compositions can additionally comprise a variety of other minor ingredients intended to make the cereal compositions nutritionally, organoleptically or visually appealing. Such materials can include, for example, vitamins, mineral fortifiers, colors, and flavors. If present, these materials can each comprise from about 0.1 to 2% by weight of the composition.

Especially preferred for use herein is trisodium phosphate ("TSP") which serves as a pH buffering agent. Useful concentrations of TSP range from about 0.1 to 0.5%.

One especially useful material is common salt. Desirably, the salt comprises about 0.1 to 2%, preferably about 0.5 to 1.0% of the cereal composition.

Still another highly preferred ingredient is a malt syrup flavor ingredient. The malt syrup comprises about 1 to 8% (dry basis), preferably about 2 to 5%.

If desired, supplemental nutritive carbohydrate sweeteners can be additionally included into the blend. Such sweeteners can comprise, for example, sucrose, fructose, glucose, corn syrup, honey, maple syrup solids, fruit juice solids, and mixtures thereof. If present, such nutritive carbohydrate sweeteners can collectively comprise about 0.1 to 10% of the dough (dry basis).

Within the broad types of cooked cereal doughs useful herein, especially preferred for use herein is a cooked cereal dough useful in the preparation of a whole wheat flaked R-T-E cereal. The cooked cereal dough comprises (dry weight basis) about 75 to 95% whole wheat, about 0.5 to 2% salt, about 0.1 to 3% malt or corn syrup and minor amounts of minerals, colors and flavors.

The cooked cereal doughs, immediately after cooking, typically will have a moisture content of about 27 to 35% by weight, preferably about 28 to 32% and for best results about 29 to 30%.

Forming Non-Circular Pellets

Thereafter, the present methods essentially comprise the step of forming the cooked cereal dough into pellets having a minimum surface area to volume ratio as described herein.

In the conventional preparation of flaked R-T-E cereals, the methods involve a step of forming the cooked cereal dough into pellets of particular shape and size. Generally, the dough is extended from a low-medium pressure extruder in the form of a cylinderical rope. The rope is sectioned generally by cutting to form individual pieces or pellets of desired size. These pellets will typically have a circular cross section. In other less common variations, the dough can be fabricated into spherical pieces which also are characterized by a circular cross section.

The pellet size is conveniently measured and expressed as a pellet count. That is, the number of pellets required to total a fixed weight. Useful herein are pellets having a pellet count of about 35 to 65 per 10 grams. Better results are obtained when the pellet count ranges from about 40 to 45 per 10 grams. The pellet count is taken before drying when the pellets have a moisture content of about 30%.

The surface area to volume ratio for such conventional cylindrical or spherical pellets having a circular cross sectional area ranges from about 21 to 22 $in^2/in^3$ (or, equivalently, "$in^{-1}$") (0.84 to 0.85 /$mm^2/mm^3$) within the 35 to 65 pellet/10 g range.

In contrast, the present pellets are essentially characterized as having a larger surface area to volume ratio.

While not wishing to be bound herein by the proposed theory, it is speculated that flake curling during the later flaking and toasting steps result in part from the internal stresses that result from the drying of the pellets prior to flaking. As the pellets are dried, moisture is lost from the pellet surface creating a moisture gradient between the relatively dried pellet surface and the relatively moist pellet center. The difference in moisture content affects the physical properties of the dough. Upon flaking, the gradient imparts internal strain within the wet flake. This results in uneven recoil of the individual flakes as they exit the flaking rolls and begin to shrink or "snapback." This results in curled flakes as they exit the flaking rolls. Upon toasting, the internal strain causes the flake to warp and cause even more flake curling. It is speculated herein that by increasing the amount of pellet surface area, upon drying, more surface area is relatively drier than the center. Upon flaking, the wet flakes prepared from pellets having a higher surface area have more internal stain. Upon flaking and toasting, the added strain and induced moisture gradients result in increases in the number and extent of flake curling.

It is further speculated herein that by having more dry surface in the dried pellet, the resultant flake would tend to curl more. A cylinder represents the least surface to volume ratio that exists for an extruded pellet shape, not counting a sphere. The cylindrical pellets have a circular cross section. The ratio of very dry pellet skin to wet pellet center increases as the pellet shape is modified from a circle to any other non-circular shape.

Most broadly, pellets herein are characterized by a surface area to volume ratio of at least 115% of the surface area to volume ratio of an equivalent weight (i.e., pellet size) of pellets having a circular cross section, especially cylindrical pellets. Since smaller pellet count will tend to have a smaller surface area to volume ratio, any pellet having a surface area to volume ratio greater than that of larger sized, lower pellet count pellets can be used. The pellet surface area ($mm^2$) to volume ($mm^3$) ratio ("$mm^2/m^3$", or equivalently, "$mm^{-1}$") desirably is at least 0.95, preferably at least 0.97 and for best results about 1.0 $mm^{-1}$. For measurements in inches, the range is $23^{-1}$ in, preferably at least 25 $in^{-1}$ to about 35 $in^{-1}$.

Measuring the surface area to volume ratio for simple shapes, e.g., having a triangular cross section, is a straight-forward geometry exercise. For more complex shapes, computer modeling can be used to calculate particular ratios. Most broadly, any pellet within the pellet count range of 35 to 50 per 10 g (e.g., each weighing 3.5 to 5.0 g) having a non-circular cross section can be used.

Preferred for use herein to provide pellets having the requisite surface area are pellets having a triangular cross section. Such shapes not only have the required surface area to volume ratio herein but also are easy to fabricate and handle. Useful herein are all types of six common forms, including right angles, equilateral, isosceles, scalene, or even curvilinear or mixtilinear. Preferred for use herein for convenience are pellets having a cross sectional configuration in the shape of an equilateral triangle.

Drying The Pellets

Thereafter, the present methods essentially comprise the step of drying the non-circular pellets prior to the flaking step to provide dried non-circular pellets having a moisture content of about 16 to 22%, preferably 18 to 20%.

Conventional drying techniques and apparatus can be used to practice the present drying step. Conveniently, the pellets are subjected to a forced hot air drying step with air temperatures of 82.2 to 121.1° C. (180 to 250° F.) until within the desired moisture content range.

Flaking

The present methods further essentially comprise the step of flaking the dried non-circular pellets to form wet flakes having a thickness ranging from about 380 to 635 microns (0.015 to 0.025 in). Conventional flaking rolls can be used to practice this step. Preferred for use are flakes having a thickness of about 430 to 585 μm (0.017 to 0.023 inch).

In preferred practice, the dried pellets are not subjected to a tempering step between the drying and flaking steps. Tempering steps are generally employed to allow the pieces to equilibrate to reduce moisture, stress, thermal or other gradients. As explained above, the presence of at least a moisture gradient is believed to be desirable herein. By tempering herein is meant a resting period of greater than 60 minutes.

Notwithstanding the above regarding avoidance of tempering, in commercial practice, it may be that after drying, the pellets are unavoidably allowed to cool prior to flaking. Such cooling can occur as a result of transport with the production facility from one unit operation to the next on conveyor belts or pneumatically. If such cooling occurs, it is desirable that the delay not exceed 120 minutes. Moreover, it is desirable that the present methods include a pellet heating step prior to the flaking step in order to assure that the pellets are at a temperature of about 79.4 to 85° C. (175 to 185° F.) immediately prior to the flaking step. Such preheating ensures that the pellets are at a temperature suitable for the subsequent flaking step.

Toasting

Thereafter, the wet flakes so formed are subjected to, and the present methods essentially further comprise, a step of toasting the wet flakes to form toasted, dried R-T-E cereal flakes having a high percentage and degree of curled flakes and a high bulk density.

A flake cereal is tenderized, toasted and partially expanded by rapid heating of wet flakes which converts the dense, hard, wet flakes into more palatable, porous, tender flakes. The toasting operation also enhances the color and flavor of the finished cereal product. Toasting can be accomplished by heating the wet flakes, usually to 93.3 to 315.5° C. (200 to 600° F.). Toasting of the R-T-E cereal pieces can be practiced in conventional dryers, vacuum dryers or other commercial baking equipment. Preferably, the wet flakes are toasted, preferably between 202.4 to 315.5° C. (400 to 600° F.) until a moisture content of approximately 2 to 5% is obtained. While not critical per se, such toasting typically requires heating for about three to 10 minutes.

The finished dried toasted flakes so prepared will then have opposed major top and bottom surfaces as well as an edge feature.

The characterization of the extent of flake curling is not easily expressed. One way, and the manner used herein to characterize the extent of flake curling is to employ a feature herein referred to as "flake width." The usage of the term flake width is not used herein to measure either dimension of the upper or lower major faces of the flake from a plan view. In such a plan view, the longer dimension is the flake's length, while the shorter dimension is the breadth of the flake. Rather, a side view is taken of the flakes on their edge.

In actual practice, a random sample of flakes is selected for measurement (e.g., 100 individual flakes). The individual flakes are mounted and viewed from their edge. Generally, in products of the prior art, the majority of the flakes (e.g., 60%) when viewed on their edge will be substantially planar and have a width of less than 5 millimeters (0.175 inch).

In contrast, the balance of the flakes (i.e., those having a width viewed on edge of greater than 5 mm or approximately 40%) will be thus characterized as curled.

Moreover, the extent of curling in these curled flakes can be further characterized by the average width of these curled flakes.

Thus, of the 100 randomly selected flakes, if in the prior art approximately 40 of these flakes when viewed on edge have a width of greater than one millimeter, their average width viewed in profile can be measured. For a common whole wheat flaked R-T-E cereal, for example, the average width of the curled flake fraction of the flaked R-T-E cereals is about 6 mm. Thus, even if the percentage of curled flakes remains about the same, those curled flakes can evidence a greater extent of curl if their average width is increased.

The finished R-T-E cereals herein are essentially characterized by having at least 45% of the flakes having a width of 5 mm or greater. Better results in terms of visual appeal and bulk density are obtained when the cereal flakes have at least 50% of the flakes having a width of 5 mm or greater. For best results, at least 55% of the flakes have a width of at least 5 mm.

The improved finished R-T-E cereals herein are further essentially characterized by a low bulk density. Initially after toasting, the R-T-E cereal is characterized by a bulk density of 150 g to 200 g per 100 in$^3$.

Thereafter, the finished dried enhanced curl flaked R-T-E cereal of the present invention can be conventionally packaged and distributed. The finish R-T-E cereal exhibits enhanced consumer appeal by virtue of the more natural appearance of the cereal having a higher percentage of curled flakes and a greater extent of curl. At a given package weight, the box will also appear more full which is also a consumer benefit.

While the bulk density of the R-T-E cereal will be highest immediately after toasting, transport to and packaging in conventional containers can result in some flake breakage and the generation of some broken pieces or fines which, in turn, result in a degradation or increase in the bulk density of the flaked R-T-E cereal. Of course, post toasting handling of the finished R-T-E cereals should be practiced to minimize flake breakage and the undesirable generation of fines.

If desired, the toasted flakes can be subjected to a screening step to remove all or a portion of the fines or other size separation step to further decrease the bulk density.

Immediately after packaging, the present R-T-E cereals nonetheless exhibit improved bulk densities ranging from about 150 to 200 g/100 in$^3$.

If desired, the present curled finished flaked R-T-E cereals can be provided with a presweetener or sugar coating. Providing a sugar coating can involve the substeps of applying a sugar coating solution or slurry to the flakes to form slurry coated flakes. Curled flakes are charged to an enrober and a topical sugar coating (4 to 20% moisture) is applied thereto. The slurry moisture content can range from about 5 to 20% sugar(s) and optionally modest quantities of oil (e.g., 1 to 10%). Sufficient amounts of sugar coating are applied to provide the R-T-E cereals with a sugar coating to cereal base ranging from about 10:100 to about 50:100.

Thereafter, the slurry coated R-T-E cereals can be finish dried to remove the moisture added by the sugar coating slurry to provide sugar coated finished flaked R-T-E cereals having a moisture content of about 2 to 5%.

It will be appreciated that addition of a sugar coating will substantially increase the bulk density of the flaked R-T-E cereals. Sugar coated flaked enhanced curled R-T-E cereals of the present invention have a bulk density of about 220 to 300 g/225 in$^3$.

In other variations, the finish R-T-E cereal flakes can be admixed with a variety of added ingredients such as raisins, nuts, marbits, dried fruit pieces, and mixtures thereof. Of course, the addition of such relatively heavy added ingredients will tend to produce blended R-T-E cereal products having higher bulk densities. However, the bulk densities of such blended products will nonetheless be less than previously known products having lower percentages of curled flakes and lesser extent of curling.

The invention is illustrated by the following examples.

Example 1

A comparison is made between enhanced curled flake products of the present invention and those commercially available under the Wheaties® brand name.

The products of the present invention were processed according to the methods of the present invention and fabricated into finished R-T-E cereal flakes. The present methods involved forming cooked cereal dough pellets having a triangular cross section. The pellets had a pellet count of about 45 per 10 grams and a surface area to volume ratio of about 25.3 inch$^{-1}$ (0.997 mm$^{-1}$).

The results of the comparison testing are given below wherein the products of the present invention are presented under the column entitled "New Wheat Flakes" while the data concerning the products presently commercially available are presented under the column entitled "Old Wheat Flakes."

The pellets having the triangular cross section were prepared using a pasta extruder type of pellet former equipped with a die having a design to impart a triangular cross section.

| Feature | Old Wheat Flakes | New Wheat Flakes |
|---|---|---|
| Bulk density | 190–260 g/100 in$^3$ | 175–210 g/100 in$^3$ |
| % Curled flakes | 40 | 45–60 |
| Average breadth | 4.5 mm | 7.5 mm |

The finished R-T-E flaked cereals so prepared have a pleasingly more natural appearance due to the increased percent and degree of curling. Notwithstanding the increased curling, the products are surprisingly robust and exhibit increased resistance to breakage.

What is claimed is:

1. A method of preparing a flaked R-T-E cereal of enhanced bulk density and percentage of curled flakes, comprising the steps of:

A. providing a cooked cereal dough having a moisture content of about 22 to 34%;
   B. forming the cooked cereal dough in pellets having a pellet count of about 35 to 65 per 10 g, said pellets having a non-circular cross section;
   C. drying the pellet to a moisture content of about 16 to 22%;
   D. flaking the pellets to form wet flakes having a moisture content of about 16 to 22% and a thickness of 380 to 635 $\mu$m (0.015 to 0.025 in) said pellets having a temperature of about 71 to 82° C. (160 to 180° F.); and
   E. toasting the wet flakes to form a toasted R-T-E cereal having a moisture content of about 2 to 4%, a bulk density of 175 to 230 g/100 in$^3$ (0.107 to 0.120 g/cc) and wherein at least 45% of the flakes have a width of at least 5 mm.

2. The method of claim 1 wherein the pellets have a surface area to volume ratio of 0.95 mm$^2$/mm$^3$ (24 in$^2$/in$^3$).

3. The process of claim 2 wherein the pellets have a triangular cross section.

4. The method of claim 2 wherein the pellets have a triangular cross section.

5. The process of claim 4 wherein the flaking step is practiced within 120 minutes after the pellet drying step.

6. The method of claim 4 wherein the flaking step is practiced within 120 minutes after the pellet drying step.

7. The process of claim 6 additionally comprising a dried pellet heating step prior to flaking.

8. The method of claim 6 additionally comprising a dried pellet heating step prior to flaking.

9. The process of claim 8 wherein at least a portion of the pellets are fabricated from a cooked cereal dough comprising at least 50% (dry weight basis) of whole wheat.

10. The method of claim 8 wherein at least a portion of the pellets are fabricated from a cooked cereal dough comprising at least 50% (dry weight basis) of whole wheat.

11. The process of claim 10 wherein the wet flakes range in thickness from about 432 to 533 $\mu$m (0.017 to 0.021 inch).

12. The method of claim 10 wherein the wet flakes range in thickness from about 432 to 533 $\mu$m (0.017 to 0.021 inch).

13. The process of claim 12 wherein the cooked cereal dough comprises 80 to 98% whole wheat
    1 to 4% malt syrup
    0.5 to 1.5% salt.

14. The method of claim 12 wherein the cooked cereal dough comprises 70 to 98% whole wheat
    0.1 to 8% malt syrup
    0.1 to 4% salt.

15. The process of claim 14 wherein the pellet count ranges from about 35 to 65 per 10 g.

16. The method of claim 14 wherein the pellet count ranges from about 35 to 65 per 10 g.

17. The process of claim 16 additionally comprising the step of applying a topical presweetener coating.

18. The method of claim 16 additionally comprising the step of applying a topical presweetener coating.

19. The method of claim 18 wherein the weight ratio of topical presweetener coating to cereal flake ranges from about 10:100 to 50:100.

20. The process of claim 1 wherein the pellets have a surface area to volume ratio of 0.95 to 1.00 mm$^{-1}$.

21. Cooked cereal dough pellets useful in the preparation of a flaked R-T-E cereal having a greater percentage and extent of curled flakes, comprising a quantity of pellets fabricated from a cooked cereal dough having
    a moisture content of about 25 to 35%,
    a pellet count of about 35 to 65 per 10 g, and
    a surface area to volume ratio of about 0.95 mm$^{-1}$ to 1.35 mm$^{-1}$.

22. The pellet of claim 21 wherein the cooked cereal dough comprises about 80 to 98% (dry weight) of whole wheat,
    about 1 to 4% (dry weight) of malt syrup,
    about 0.5 to 1.5% (dry weight) salt.

23. The pellets of claim 22 having a triangular cross section.

24. The pellets of claim 23 having a pellet count of about 35 to 65 per 10 g.

25. The pellets of claim 24 having a surface area to volume ratio of about 0.95 to 1.35 mm$^{-1}$.

26. A process of preparing a flaked R-T-E cereal of enhanced bulk density and percentage of curled flakes, comprising the steps of A. providing a cooked cereal dough having a moisture content of about 25 to 35%;
    B. forming the cooked cereal dough in pellets having a pellet count of about 35 to 65 per 10 g, said pellets having a non-circular cross section;
    C. drying the pellet to a moisture content of about 16 to 22%;
    D. flaking the pellets to form wet flakes having a moisture content of about 16 to 22% and a thickness of 380 to 635 $\mu$m (0.015 to 0.025 in) said pellets having a temperature of about 71 to 82° C. (160 to 180° F.); and
    E. toasting the wet flakes to form a toasted R-T-E cereal having a moisture content of about 2 to 4%, a bulk density of 150 to 200 g/100 in$^3$ (0.107 to 0.120 g/cc) and wherein at least 45% of the flakes have a width of at least 5 mm.

27. In a method of producing a flaked R-T-E cereal from cooked cereal dough pellets, flaking the pellets to form wet flakes and toasting the wet flakes to form finished flakes, the improvement comprising, forming the pellets having a non-circular cross section, having a pellet count of 35 to 65 per 10 g, and a surface area to volume ratio of about 0.95 to 1.3 mm$^{-1}$.

* * * * *